United States Patent
Chaudhari et al.

(10) Patent No.: US 11,118,705 B2
(45) Date of Patent: Sep. 14, 2021

(54) QUICK CONNECT FIREWALL SEAL FOR FIREWALL

(71) Applicant: General Electric Company, Schenectady, NY (US)

(72) Inventors: Vinod Shashikant Chaudhari, Bengaluru (IN); Greedaran Kubendran Jankin, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 357 days.

(21) Appl. No.: 16/057,043

(22) Filed: Aug. 7, 2018

(65) Prior Publication Data
US 2020/0049279 A1 Feb. 13, 2020

(51) Int. Cl.
*F16L 5/10* (2006.01)
*F02C 7/25* (2006.01)
*F02C 7/32* (2006.01)

(52) U.S. Cl.
CPC .... *F16L 5/10* (2013.01); *F02C 7/25* (2013.01); *F02C 7/32* (2013.01); *F05D 2240/55* (2013.01)

(58) Field of Classification Search
CPC ..... F16L 5/04; F16L 5/10; F16L 41/18; F16L 41/088; F02C 7/25; F02C 7/32; F05D 2240/55; F05D 2300/437; B65D 53/00; F16J 1/20; F16J 15/32; F16J 15/3212; F01D 11/003
USPC ..... 285/138.1, 139.2, 139.1, 142.1; 384/145, 384/154, 183, 203, 206, 215, 477; 403/52, 90
See application file for complete search history.

(56) References Cited

U.S. PATENT DOCUMENTS

| | | | | |
|---|---|---|---|---|
| 2,666,656 A | * | 1/1954 | Bruning | F16L 37/23 137/899.2 |
| 4,129,306 A | * | 12/1978 | Konno | B01F 7/06 277/507 |
| 4,758,028 A | * | 7/1988 | Davies | F16J 15/065 16/2.2 |
| 5,069,137 A | | 12/1991 | Martwick | |
| 5,079,910 A | | 1/1992 | Hirst et al. | |
| 5,087,512 A | | 2/1992 | Uihlein et al. | |

(Continued)

FOREIGN PATENT DOCUMENTS

EP 2062785 B1 6/2010

*Primary Examiner* — Courtney D Heinle
*Assistant Examiner* — Danielle M. Christensen
(74) *Attorney, Agent, or Firm* — Venable LLP; Michele V. Frank

(57) ABSTRACT

The present disclosure is directed generally to firewall seals for sealing pass-through members extending through a firewall, such as a firewall of a turbine engine. In one example aspect, the firewall seal includes quick-connect features that facilitate more efficient assembly and disassembly of the firewall seal to and from the pass-through member. Particularly, the firewall seal may define a slit extending through at least a portion of the seal that allows for the pass-through member to be slid through the slit and positioned in place. A retainer formed of an elastomeric material may include a metal spring plate that springs the seal back into place after the pass-through member is positioned within the seal. Moreover, a spherical bearing of the firewall seal may include features for receiving a static or dynamic pass-through member therethrough and for allowing the pass-through member to translate and rotate.

19 Claims, 10 Drawing Sheets

(56) References Cited

U.S. PATENT DOCUMENTS

| | | |
|---|---|---|
| 5,091,605 A | 2/1992 | Clifford |
| 5,102,697 A | 4/1992 | Grunke et al. |
| 5,152,662 A | 10/1992 | Hirst et al. |
| 5,202,163 A | 4/1993 | Uihlein et al. |
| 5,251,917 A | 10/1993 | Chee et al. |
| 5,285,812 A | 2/1994 | Morales |
| 5,458,343 A | 10/1995 | Dornfeld et al. |
| 5,836,048 A | 11/1998 | Rossman et al. |
| 5,910,094 A | 6/1999 | Kraft et al. |
| 6,141,915 A | 11/2000 | Andersen et al. |
| 6,161,764 A | 12/2000 | Jatnicks |
| 6,213,541 B1 | 4/2001 | Razgunas et al. |
| 6,302,932 B1 | 10/2001 | Unger et al. |
| 6,474,312 B1 | 11/2002 | Zulauf et al. |
| 6,516,618 B1 | 2/2003 | Bock |
| 6,517,246 B2 * | 2/2003 | Blakley ............. F16C 27/02 384/192 |
| 6,553,639 B2 | 4/2003 | Hobbs et al. |
| 6,670,291 B1 | 12/2003 | Tompkins et al. |
| 6,887,381 B2 | 5/2005 | Rohrbach et al. |
| 6,935,009 B2 | 8/2005 | Salameh |
| 6,951,317 B2 | 10/2005 | Woessner et al. |
| 6,959,719 B2 | 11/2005 | Truss |
| 6,971,320 B1 | 12/2005 | Maldonado-Cortes et al. |
| 6,981,737 B2 | 1/2006 | Welsh |
| 6,987,459 B2 | 1/2006 | Tice |
| 6,989,104 B2 | 1/2006 | Reamsnyder et al. |
| 7,010,906 B2 | 3/2006 | Cazenave |
| 7,075,445 B2 | 7/2006 | Booth et al. |
| 7,260,994 B2 | 8/2007 | Oboodi et al. |
| 7,278,258 B2 | 10/2007 | Greco |
| 7,316,782 B2 | 1/2008 | Rohrbach et al. |
| 7,350,619 B2 | 4/2008 | Williams |
| 7,357,093 B2 | 4/2008 | Potter et al. |
| 7,375,643 B2 | 5/2008 | McAward |
| 7,409,848 B2 | 8/2008 | Petrinic et al. |
| 7,458,214 B2 | 12/2008 | Philippe |
| 7,482,193 B2 | 1/2009 | DCamp et al. |
| 7,510,652 B2 | 3/2009 | Rohrbach et al. |
| 7,526,921 B2 | 5/2009 | Williams et al. |
| 7,540,142 B2 | 6/2009 | Sheoran et al. |
| 7,560,838 B2 | 7/2009 | van der Woude |
| 7,581,362 B2 | 9/2009 | Vaughan |
| 7,600,714 B2 | 10/2009 | Sheoran et al. |
| 7,633,261 B2 | 12/2009 | Baron et al. |
| 7,633,393 B2 | 12/2009 | Bonne |
| 7,676,991 B2 | 3/2010 | Truss |
| 7,748,953 B2 | 7/2010 | Smith |
| 7,803,724 B2 | 9/2010 | Ting et al. |
| 7,810,312 B2 | 10/2010 | Stretton et al. |
| 7,819,935 B2 | 10/2010 | Austin, Jr. et al. |
| 7,828,298 B2 | 11/2010 | Cummings |
| 7,840,021 B2 | 11/2010 | Greco et al. |
| 7,845,298 B2 | 12/2010 | Rayner et al. |
| 7,875,812 B2 | 1/2011 | Steffler |
| 7,886,520 B2 | 2/2011 | Stretton et al. |
| 7,930,928 B2 | 4/2011 | Ruston |
| 7,955,049 B2 | 6/2011 | Hopkins |
| 7,972,406 B2 | 7/2011 | Zheng et al. |
| 8,022,304 B2 | 9/2011 | Baydoun et al. |
| 8,028,351 B2 | 10/2011 | Stachler et al. |
| 8,029,345 B2 | 10/2011 | Messmer et al. |
| 8,087,674 B2 | 1/2012 | Cummings |
| 8,141,816 B2 | 3/2012 | Robbins et al. |
| 8,251,109 B2 | 8/2012 | Gebert et al. |
| 8,309,232 B2 | 11/2012 | Daeubler et al. |
| 8,327,866 B2 | 12/2012 | Parks, Jr. |
| 8,388,303 B2 | 3/2013 | Weidmann et al. |
| 8,474,125 B2 | 7/2013 | Steffler |
| 8,474,753 B2 | 7/2013 | Hill et al. |
| 8,511,095 B2 | 8/2013 | Mullender et al. |
| 8,544,503 B2 | 10/2013 | Barber et al. |
| 8,587,441 B2 | 11/2013 | Laubach et al. |
| 8,588,996 B2 | 11/2013 | Hill et al. |
| 8,590,904 B2 | 11/2013 | Gelorme et al. |
| 8,689,504 B2 | 4/2014 | Monden et al. |
| 8,707,472 B2 | 4/2014 | Stachler et al. |
| 8,729,173 B2 | 5/2014 | Wang et al. |
| 8,752,387 B2 | 6/2014 | Scully |
| 8,783,372 B2 | 7/2014 | Fabre et al. |
| 8,814,130 B2 | 8/2014 | Lelic et al. |
| 8,839,815 B2 | 9/2014 | Young et al. |
| 8,882,112 B2 | 11/2014 | Allen |
| 8,882,442 B2 | 11/2014 | Hussain et al. |
| 8,889,929 B2 | 11/2014 | Yang et al. |
| 8,893,815 B2 | 11/2014 | Mauney |
| 8,894,756 B2 | 11/2014 | Galliher et al. |
| 8,899,264 B2 | 12/2014 | Young et al. |
| 8,905,063 B2 | 12/2014 | Young et al. |
| 8,931,284 B2 | 1/2015 | Hussain et al. |
| 8,947,242 B2 | 2/2015 | Kucera et al. |
| 8,950,069 B2 | 2/2015 | Ress, Jr. |
| 8,985,941 B2 | 3/2015 | Mayes et al. |
| 8,993,816 B2 | 3/2015 | Yang et al. |
| 9,074,770 B2 | 7/2015 | Young et al. |
| 9,074,922 B2 | 7/2015 | Dayal et al. |
| 9,080,924 B2 | 7/2015 | Welker et al. |
| 9,091,178 B2 | 7/2015 | Jahn |
| 9,109,193 B2 | 8/2015 | Galliher et al. |
| 9,133,770 B2 | 9/2015 | Henkle et al. |
| 9,207,468 B2 | 12/2015 | Davalos et al. |
| 9,211,069 B2 | 12/2015 | Larsen et al. |
| 9,316,118 B2 | 4/2016 | Alvarez et al. |
| 9,340,763 B2 | 5/2016 | Damren et al. |
| 9,347,585 B2 | 5/2016 | Helvenston et al. |
| 9,347,678 B2 | 5/2016 | Stakutis et al. |
| 9,382,808 B2 | 7/2016 | Hodgkinson |
| 9,435,552 B2 | 9/2016 | Sulva |
| 9,453,595 B2 | 9/2016 | Velarde et al. |
| 9,478,896 B2 | 10/2016 | Fitt et al. |
| 9,523,504 B2 | 12/2016 | Steele |
| 9,546,311 B2 | 1/2017 | Seeton et al. |
| 9,557,059 B2 | 1/2017 | Kucera et al. |
| 9,582,987 B2 | 2/2017 | Eskildsen et al. |
| 9,587,848 B2 | 3/2017 | Adamik et al. |
| 9,618,120 B2 | 4/2017 | Duncan |
| 9,643,733 B2 | 5/2017 | Livingston |
| 9,645,584 B2 | 5/2017 | Kucera et al. |
| 9,650,149 B2 | 5/2017 | Wilcox et al. |
| 2003/0126854 A1 | 7/2003 | Cazenave et al. |
| 2005/0046217 A1 | 3/2005 | Campbell |
| 2007/0114791 A1 | 5/2007 | Williams |
| 2007/0228668 A1 | 10/2007 | Dempsey et al. |
| 2008/0252021 A1 | 10/2008 | Handley et al. |
| 2012/0070289 A1 | 3/2012 | Charier et al. |
| 2014/0075948 A1 | 3/2014 | Exner |
| 2014/0116752 A1 * | 5/2014 | Sodaro ............. F02C 7/25 174/153 G |
| 2014/0262358 A1 | 9/2014 | Livingston et al. |
| 2015/0367947 A1 | 12/2015 | Audart-Noel et al. |
| 2016/0315456 A1 | 10/2016 | Foerg |
| 2017/0288337 A1 | 10/2017 | Martino et al. |
| 2018/0050721 A1 * | 2/2018 | Wagner ............. B60G 7/005 |

* cited by examiner

QUICK CONNECT FIREWALL SEAL FOR FIREWALL

FIELD

The present subject matter relates generally to a firewall seal for sealing a pass-through member extending through a firewall.

BACKGROUND

A turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

Many turbine engines include one or more annular firewalls surrounding the engine, e.g., to separate relatively cool non-fire zones from an ignition or fire zone generally disposed about the combustion section or any hot section. An airframe firewall may also be included to protect the aircraft or other vehicle to which the gas turbine engine is mounted. Although firewalls separate fire zones and non-fire zones, various fuel, oil and air lines extend from the non-fire zones to the ignition or fire-zone for channeling fuel, oil and air to the required section. Various oil lines of lubrication systems and electrical lines and even some other components may also extend between the non-fire and ignition or fire zones. During operation of the gas turbine engine, flammable fluid such as fuel or oil may leak in the non-fire zone region, and the firewall is provided to reduce the possibility of ignition thereof from the relatively hot casings contained downstream of the firewall within the ignition section.

Firewalls typically have various pass-through members such as fluid conduits, tubes, and electrical wiring harnesses that must be suitably sealed at the firewall to prevent or minimize cross fluid flow communication between the fire zones and the ignition zone during operation. Some pass-through members may be static (e.g., not movable) while some pass-through members may be dynamic (e.g., configured to translate and/or rotate about). Thus, static firewall seals and dynamic firewall seals are typically used to seal static pass-through members and dynamic pass-through members, respectively. Conventionally, some firewall seals have included many sealing disks stacked together and held in place by various plates and brackets to seal pass-through members at the firewall. The number of parts and stacked nature of the disks adds tolerance stack-up and assembly complexity. Some conventional firewall seals include bellows with various sealing elements to seal pass-through members at the firewall. Such designs require a considerable amount of space, a generally heavy, and make assembly of the firewall seal with the pass-through member challenging.

Accordingly, improved firewall seals for use in turbine engines that address one or more of the challenges noted above would be useful.

BRIEF DESCRIPTION

Aspects and advantages of the invention will be set forth in part in the following description, or may be obvious from the description, or may be learned through practice of the invention.

In one exemplary embodiment of the present disclosure, a firewall seal for a pass-through member extending through an aperture defined by a firewall is provided. The firewall seal includes a retainer removably coupled with the firewall and extending between a first face and a second face opposing the first face. The retainer defines a retainer pass-through aperture in communication with the aperture of the firewall. Further, the firewall seal includes a spring plate embedded within the retainer. Moreover, the firewall seal includes a spherical bearing retained by the retainer at the retainer pass-through aperture, the spherical bearing comprising an outer retaining member and an inner retaining member movable relative to the outer retaining member, the inner retaining member configured to receive the pass-through member extending through the aperture of the firewall.

In another exemplary embodiment of the present disclosure, a firewall seal for a pass-through member extending through an aperture defined by a firewall of a turbine engine is provided. The firewall seal defines an axial direction. The firewall seal includes a retainer removably coupled with the firewall and extending between a first end and a second end along a direction orthogonal to the axial direction, wherein the retainer defines a retainer pass-through aperture and is formed of an elastomeric material. Further, the firewall seal includes a spherical bearing retained by the retainer at the retainer pass-through aperture, the spherical bearing comprising an outer retaining member and an inner retaining member movable relative to the outer retaining member, the inner retaining member configured to receive the pass-through member extending through the aperture of the firewall. In addition, the retainer at least partially defines a slit extending from one of the first end and the second end to the retainer pass-through aperture.

In yet another exemplary embodiment of the present disclosure, a turbine engine is provided. The turbine engine includes a casing and a firewall extending from the casing and defining an aperture. The turbine engine also includes a pass-through member extending through the aperture. Moreover, the turbine engine includes a firewall seal removably mounted to the firewall. The firewall seal includes a retainer formed of an elastomeric material and extending between a first face and a second face opposing the first face, the retainer defining a retainer pass-through aperture in communication with the aperture of the firewall. In addition, the firewall seal includes a spring plate formed of a metal material and embedded within the retainer between the first face and the second face. In addition, the firewall seal includes a spherical bearing retained by the retainer at the retainer pass-through aperture, the spherical bearing comprising an outer retaining member comprising an inner surface having a truncated spherical shape and an inner retaining member movable relative to the outer retaining member and comprising an outer surface shaped complementary to the inner surface of the outer retaining member, the inner retaining member configured to receive the pass-through member extending through the aperture of the firewall and through the pass-through aperture of the retainer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
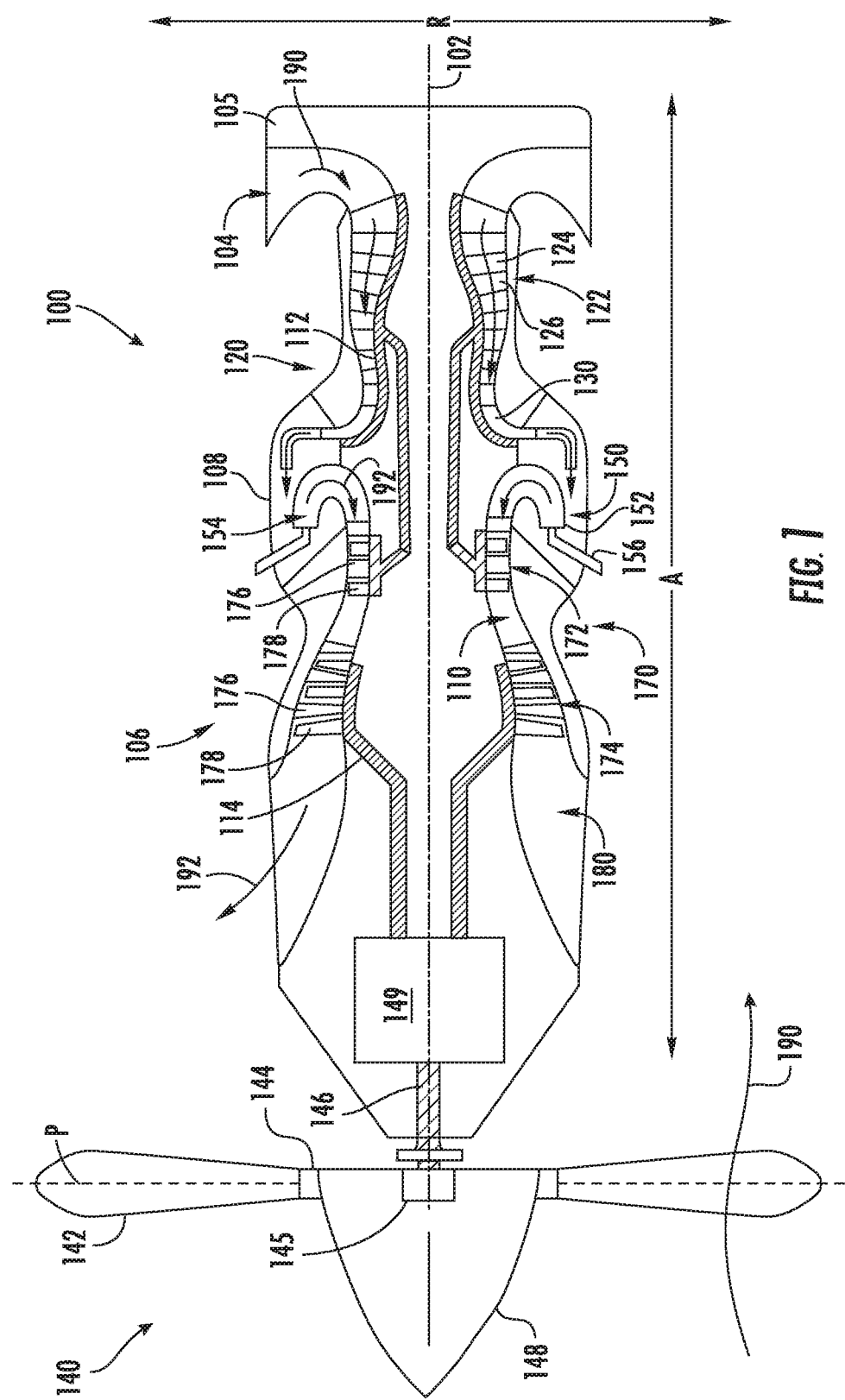
FIG. 1 provides a schematic cross-sectional view of a gas turbine engine in accordance with exemplary embodiments of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, terms of approximation, such as "approximately," "substantially," or "about," refer to being within a ten percent margin of error. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

The present disclosure is directed generally to firewall seals for sealing pass-through members extending through a firewall, e.g., through a firewall of a turbine engine. In one example aspect, the firewall seal includes quick-connect features that facilitate more efficient assembly and disassembly of the firewall seal to and from the pass-through member. Particularly, the firewall seal may define a slit extending through at least a portion of the seal that allows for the pass-through member to be slid through the slit and positioned in place. A retainer formed of an elastomeric material may include a metal spring plate that springs the seal back into place after the pass-through member is positioned within the seal. Moreover, a spherical bearing of the firewall seal may include features for receiving a static or dynamic pass-through member therethrough and for allowing the pass-through member to translate and rotate.

Although exemplary firewall seals are described herein for sealing pass-through members of firewalls of turbine engines, the firewall seals of the present disclosure may also be incorporated in other applications and industries. For instance, the example firewall seals disclosed herein may be applicable to the aviation, marine, automobile, space, and power generation industries. Further, the firewall seals disclosed herein may also be applicable to other types of engines besides turbine engines, such as e.g., piston driven engines.

FIG. 1 provides a schematic cross-sectional view of an exemplary gas turbine engine 100 and a propulsor 140 operatively coupled thereto as may incorporate various embodiments disclosed herein. For the depicted embodiment of FIG. 1, the gas turbine engine 100 is a reverse-flow gas turbine engine configured as a turboprop for an aerial vehicle. As shown, the gas turbine engine 100 defines an axial direction A (extending parallel to a longitudinal centerline 102 provided for reference), a radial direction R, and a circumferential direction C (not shown) disposed about the axial direction A. In general, the axial direction A extends parallel to the longitudinal axis 102, the radial direction R extends orthogonally to and from the longitudinal axis 102, and the circumferential direction C extends concentrically around the longitudinal axis 102.

The gas turbine engine 100 includes a core turbine engine 106 disposed downstream of the propulsor 140. The propulsor 140 is operable with and driven by the core turbine engine 106. The exemplary core turbine engine 106 depicted includes a substantially tubular outer casing 108 that extends generally along axial direction A. The outer casing 108 generally encloses the core turbine engine 106 and may be formed from a single casing or multiple casings. The core turbine engine 106 includes, in a serial flow relationship, a compressor section 120, a combustion section 150, a turbine section 170, and an exhaust section 180. The compressor section 120 includes an axial compressor 122 and an impeller 130 positioned downstream of the axial compressor 122. The combustion section 150 includes a plurality of fuel nozzles 156 disposed about the longitudinal axis 102 and spaced apart along the circumferential direction C. The combustion section 150 also includes a combustor 152. The combustor 152 defines a combustion chamber 154. The turbine section 170 includes an HP turbine 172 and an LP turbine 174. For this embodiment, the HP turbine 172 is a gas generation turbine for powering the compressor section 120. The LP turbine 174 is a free or power turbine that rotates about the longitudinal axis 102 independently of the gas generation turbine, or for this embodiment, the HP turbine 172. The compressor section 120, combustion section 150, turbine section 170, and the exhaust section 180 are in fluid communication with each other and define a core air flowpath 110.

A high pressure (HP) shaft or spool 112, or for this embodiment a gas generation shaft, drivingly connects the HP turbine 172 to the compressor 122. A low pressure (LP) shaft or spool 114, or for this embodiment a power turbine shaft, drivingly connects the LP turbine 174 to the propulsor 140. For the embodiment depicted, the propulsor 140 is a variable pitch propeller having a plurality of propeller blades 142 coupled to a disk 144 in a spaced apart manner along the circumferential direction. As depicted, the propeller blades 142 extend outwardly from disk 144 generally along the radial direction R. Each propeller blade 142 is rotatable relative to the disk 144 about a pitch axis P by virtue of the propeller blades 142 being operatively coupled to a suitable actuation member 145 configured to collectively vary the pitch of the propeller blades 142 in unison. The propeller blades 142, disk 144, and actuation member 145 are together rotatable about the longitudinal axis 102 by the LP shaft 114 across a power gearbox 149. The power gearbox 149 includes a plurality of gears for stepping down the rotational speed of the LP shaft 114 to a more efficient rotational speed and is attached to one or both of a core frame or a fan frame through one or more coupling systems. In particular, LP shaft 114 drives a gear train housed within power gearbox 149, which in turn operatively supplies power to the propulsor 140 via an output shaft 146 at a reduced RPM. Disk 144 is covered by a rotatable spinner or front hub 148 aerodynamically contoured to promote an airflow through the plurality of propeller blades 142.

During operation of the gas turbine engine 100, a volume of air 190 passes through blades 142 of the propulsor 140 and is urged toward an annular inlet 104 of the core turbine engine 106. More specifically, gas turbine engine 100 includes an inlet body 105 that defines the annular inlet 104 that routes a portion of the flow of air 190 from inlet 104 downstream to the compressor section 120. The compressor section 120 includes the axial compressor 122 that includes one or more sequential stages of compressor stator vanes 124, one or more sequential stages of compressor rotor blades 126, and the impeller 130. The one or more sequential stages of compressor stator vanes 124 are coupled to the outer casing 108 and compressor rotor blades 126 are coupled to HP shaft 112 to progressively compress the flow of air 190. Impeller 130 further compresses air 190 and directs the compressed air 190 into the combustion section 150 where air 190 mixes with fuel. The combustor 152 combusts the air/fuel mixture to provide combustion gases 192.

Combustion gases 192 flow through HP turbine 172, which includes one or more sequential stages of turbine stator vanes 176 and one or more sequential stages of turbine blades 178. The one or more sequential stages of turbine stator vanes 176 are coupled to the outer casing 108 and the turbine blades 178 are coupled to HP shaft 112 to extract thermal and/or kinetic energy from the combustion gases 192. Combustion gases 192 subsequently flow through LP turbine 174, where an additional amount of energy is extracted through additional stages of turbine stator vanes 176 and turbine blades 178 coupled to LP shaft 114. The energy extraction from HP turbine 172 supports operation of the axial compressor 122 and impeller 130 through HP shaft 112 and the energy extraction from LP turbine 174 supports operation of first propulsion assembly 52 through LP shaft 114. Combustion gases 192 exit gas turbine engine 100 through the exhaust section 180.

It should be appreciated that the exemplary gas turbine engine 100 depicted in FIG. 1 is by way of example only and that in other exemplary embodiments, the gas turbine engine 100 may have any other suitable configuration. For example, it should be appreciated that in other exemplary embodiments, the gas turbine engine 100 may instead be configured as any other suitable turbine engine, such as a turbofan engine, turbojet engine, turboshaft, etc. Furthermore, although the gas turbine engine 100 described above is an aeronautical gas turbine engine for use in a fixed-wing or rotor aircraft, in other exemplary embodiments, gas turbine engine 100 may be configured as any suitable type of gas turbine engine that used in any number of applications, such as a land-based industrial gas turbine engine, or an aeroderivative gas turbine engine. In addition, in other exemplary embodiments, the turbine engine may include any suitable number of compressors, turbines, shafts, etc. For example, as will be appreciated, HP shaft 112 and LP shaft 114 may further be coupled to any suitable device for any suitable purpose. For example, in certain exemplary embodiments, gas turbine engine 100 of FIG. 1 may be utilized to drive a main rotor of a helicopter, may be utilized in aeroderivative applications, etc. Additionally, in other exemplary embodiments, gas turbine engine 100 may include any other suitable type of combustor, and may not include the exemplary reverse flow combustor depicted.

Figure 2:
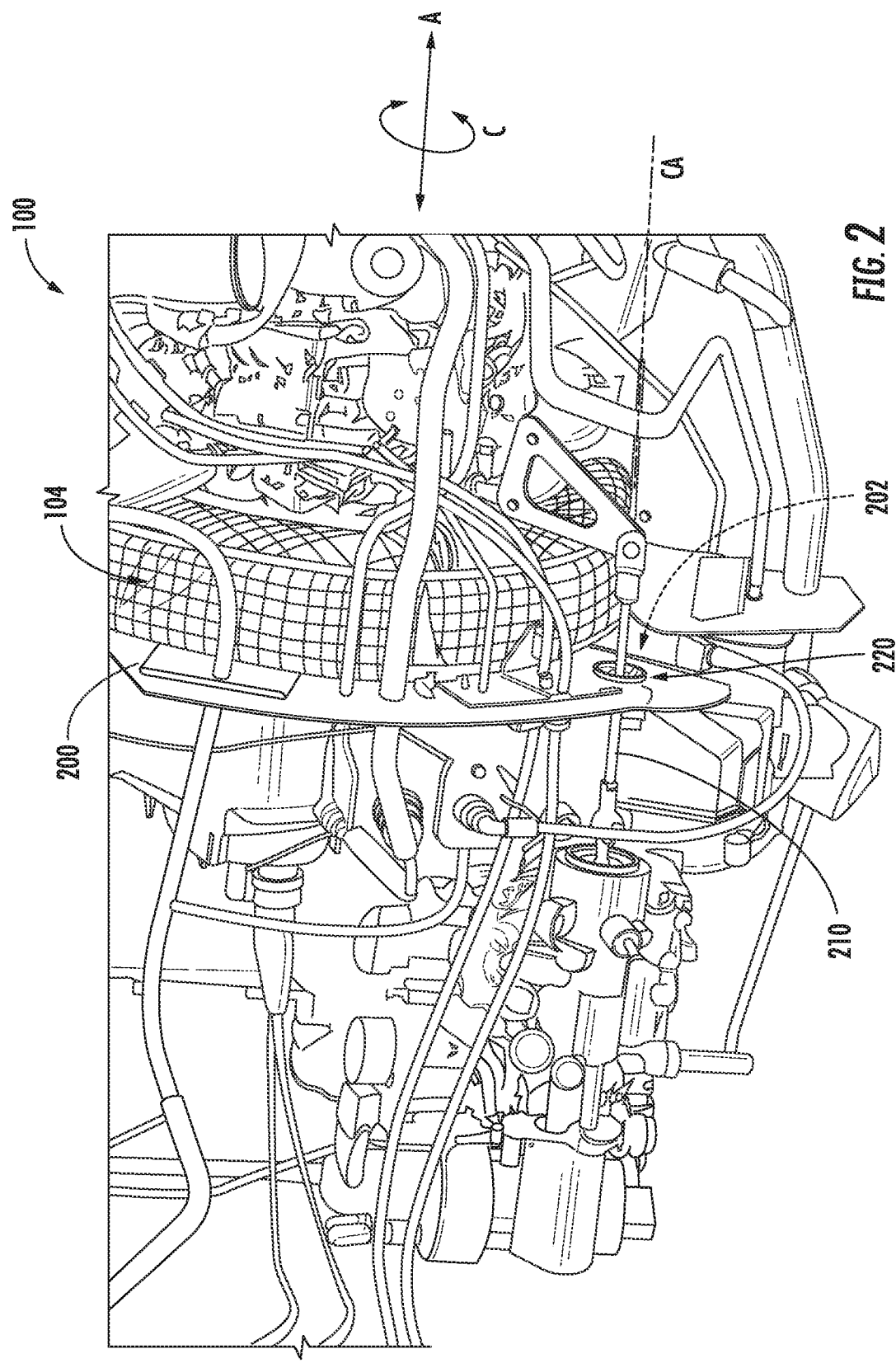
FIG. 2 provides a close up, perspective view of the gas turbine engine of FIG. 1 depicting a firewall and a pass-through member extending therethrough and sealed with a firewall seal in accordance with exemplary embodiments of the present disclosure.

FIG. 2 provides a close up, perspective view of the gas turbine engine 100 of FIG. 1 depicting a firewall 200 and a pass-through member 210 extending therethrough and sealed with a firewall seal 220 in accordance with exemplary embodiments of the present disclosure. More particularly, as shown, the firewall 200 extends annularly about the outer casing 108 at an aft end of the gas turbine engine 100 proximate the inlet 104. The annular firewall 200 has a disk-like shape that extends radially from the outer casing 108. The firewall 200 shown in FIG. 2 is an airframe firewall. Generally, the airframe firewall 200 partitions the relatively hot zones positioned forward of the firewall 200 along the axial direction A from the control systems and electronics aft of the firewall 200.

It will be appreciated that the gas turbine engine 100 may include other firewalls in addition or alternatively to the airframe firewall 200 described above. For instance, the gas turbine engine 100 may include an aft firewall extending outward from the casing 108 along the radial direction R. The aft firewall partitions the compressor section 120 from the combustion section 150 thus separating a relatively cool fire zone (radially outward of the compressor section 120) from the relatively hot ignition zone (radially outward of the combustion section 150). The gas turbine engine 100 may also include a forward firewall extending outward from the casing 108 along the radial direction R. The forward firewall partitions the combustion section 150 from the turbine and exhaust sections 170, 180 (see FIG. 1) thus separating the relatively hot fire zone (radially outward of the combustion section 150) from the relatively cool fire zone (radially outward of the turbine and exhaust sections 170, 180). Such firewalls may prevent inadvertent ignition of flammable gases, among other benefits.

As further shown in FIG. 2, a plurality of pass-through members extend through the firewall 200, including pass-through member 210. The various pass-through members may be a fluid carrying tube or conduit, a wiring harness containing a group of electrical wires, or some other elongated tubular member. The pass-through members extend through apertures defined by the firewall 200. For instance, the pass-through member 210 extends through pass-through aperture 202 defined by the firewall 200. The pass-through member 210 is linked at its forward end and its aft end and is translatable along the axial direction A and is rotatable. That is, the pass-through member 210 is rotatable about a centerline axis CA defined by the firewall seal 220 and extending generally parallel to the axial direction A. In accordance with exemplary aspects of the present disclosure, the firewall seal 220 includes features for sealing such dynamic pass-through members at the firewall 200 thus preventing relatively hot gasses from passing through the firewall 200. Some of the pass-through members, however, are static (i.e., they do not translate or rotate). In accordance with exemplary aspects of the present disclosure, the firewall seal 220 includes features for sealing such static pass-through members at the firewall 200, and accordingly, relatively hot gasses are prevented from passing through the firewall 200. Further, the firewall seal 220 is removably coupled with the firewall 200 and the pass-through member 210. In some embodiments, the firewall seal 220 includes certain quick connect features that facilitate ease of assembly and disassembly of the firewall seal 220 to/from the pass-through member 210 and firewall 200.

Figure 3:
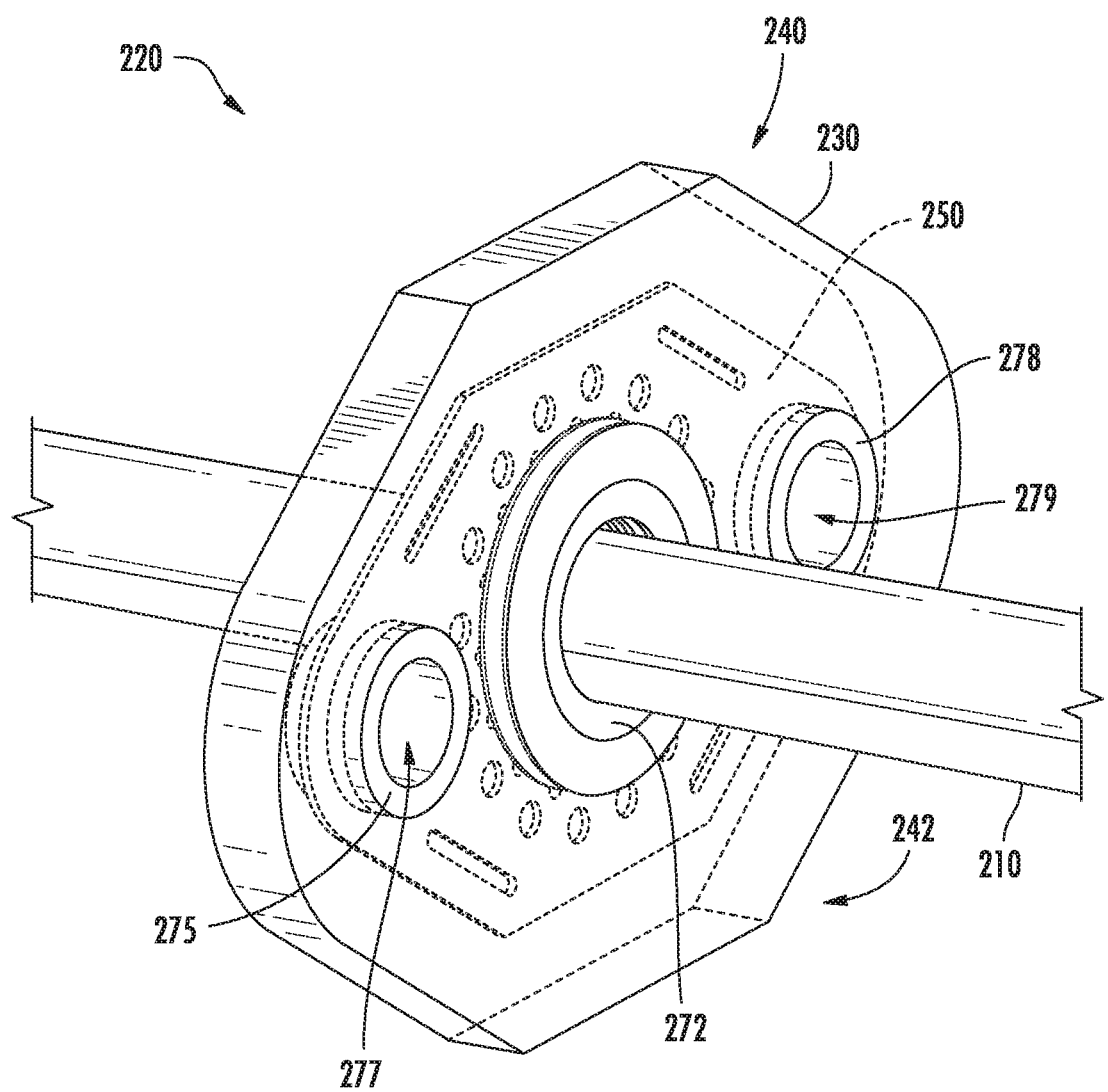
FIG. 3 provides a close up, perspective view of the firewall seal of FIG. 2 depicting the pass-through member extending therethrough.
Figure 4:
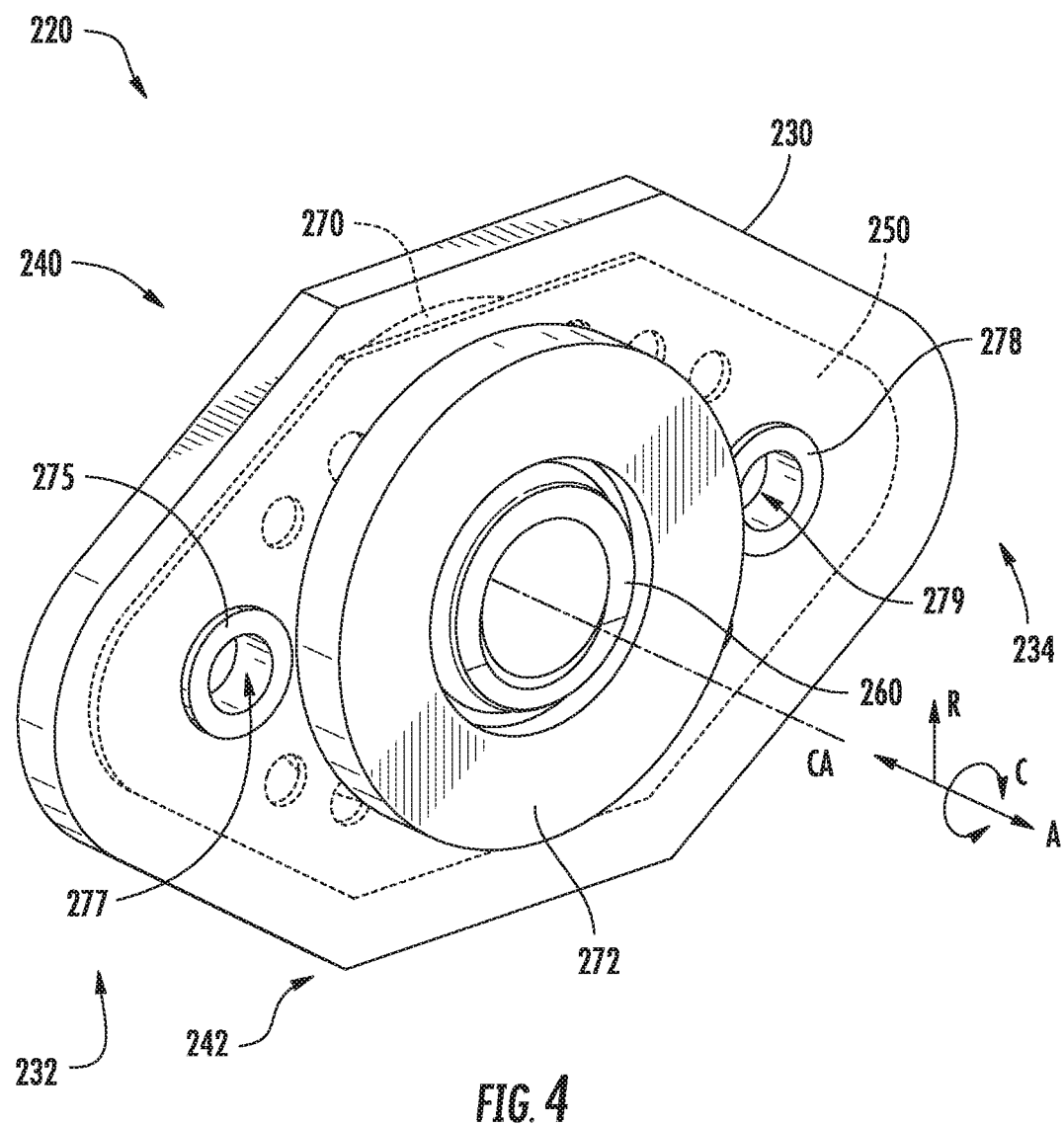
FIG. 4 provides a close up, perspective view of the firewall seal of FIG. 3 without the pass-through member removed for additional clarity.
Figure 5:
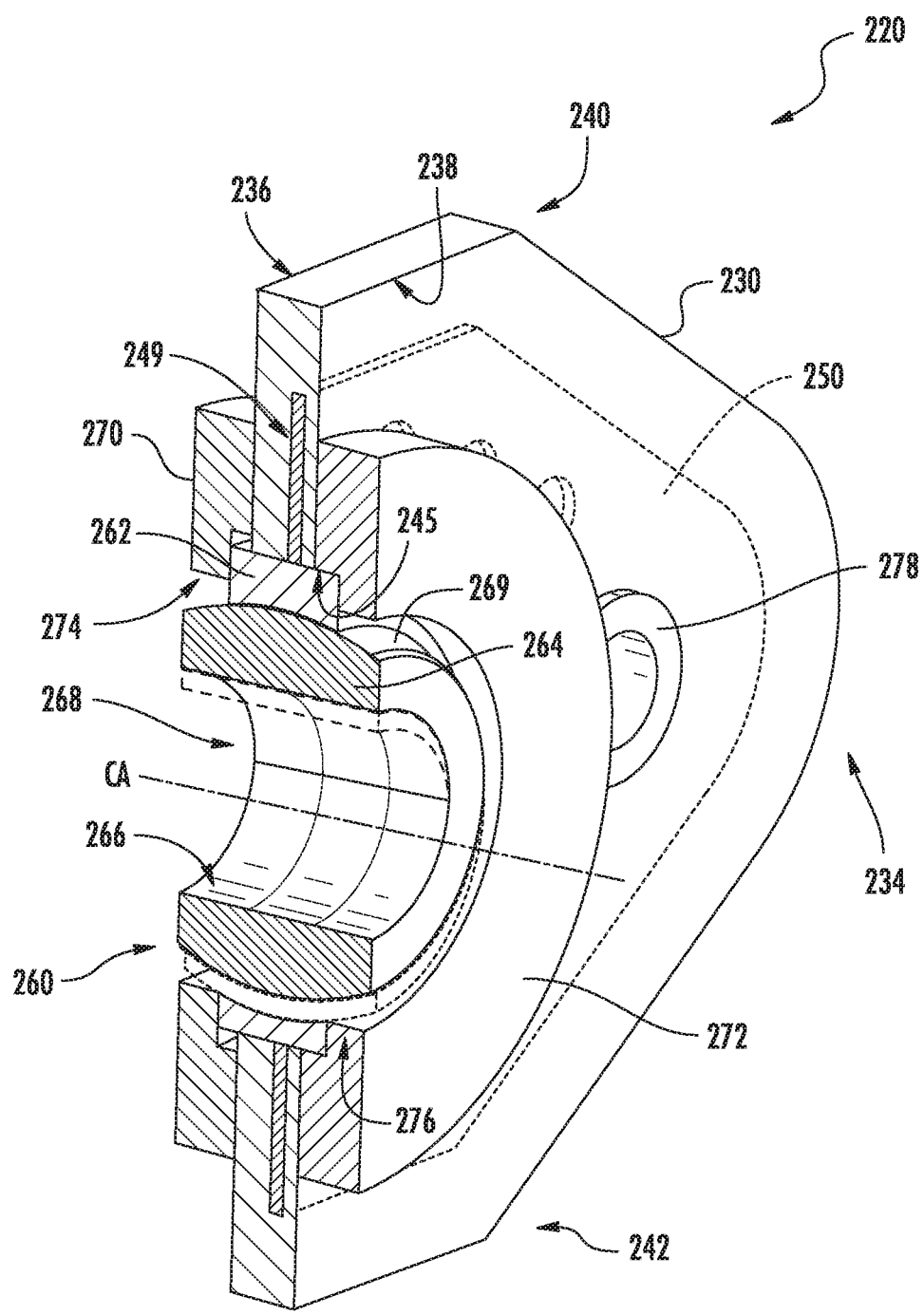
FIG. 5 provides a cross sectional view of the firewall seal taken along line 5-5 of FIG. 4.

FIGS. 3, 4, and 5 provide various views of the firewall seal 220 of FIG. 2. In particular, FIG. 3 provides a close up, perspective view of the firewall seal 220 of depicting the pass-through member 210 extending therethrough. FIG. 4 provides a close up, perspective view of the firewall seal 220 without the pass-through member 210 extending therethrough. FIG. 5 provides a cross sectional view of the firewall seal 220 taken along line 5-5 of FIG. 4.

As shown, the firewall seal 220 includes a retainer 230. In FIGS. 3, 4, and 5, the retainer 230 is shown transparent. In some embodiments, the retainer 230 is formed of an elastomeric material. For instance, for this embodiment, the retainer 230 is formed of a silicone metal material. In other exemplary embodiments, the retainer 230 may be formed of a silicone rubber material. In some embodiments, the retainer 230 is reinforced. Specifically, the retainer 230 may be reinforced with a spring plate 250 embedded therein. As one example, the retainer 230 may be overmolded onto the spring plate 250. As another example, the retainer 230 and spring plate 250 may be additively manufactured in a single print by a suitable 3D printing process. The spring plate 250 is formed of a material having a certain stiffness that provides a "spring back" action when the retainer 230 is mounted to the pass-through member 210 as will be described in greater detail herein. The retainer 230 and the spring plate 250 are described in greater detail below with reference to FIGS. 6 and 7.

Figure 6:
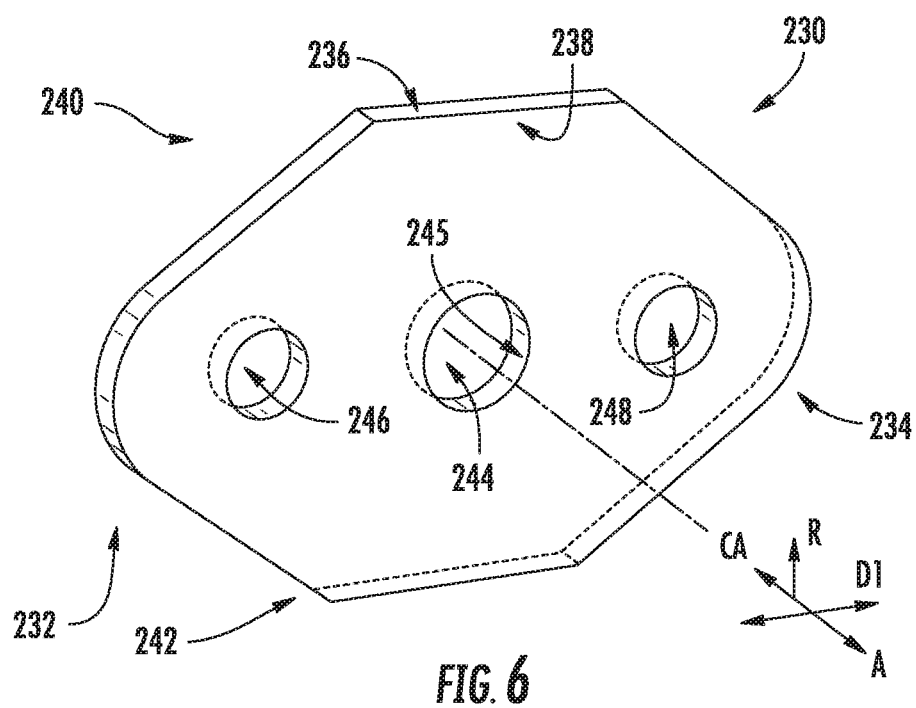
FIG. 6 provides a perspective view of the reinforced retainer of the firewall seal of FIG. 3.

FIG. 6 provides a perspective view of the retainer 230 of FIG. 3. Generally, the retainer 230 extends between a first side 232 and a second side 234 opposite the first side 232, e.g., along a first direction D1 orthogonal to the axial direction A. The retainer 230 also extends between a first face 236 and an opposing second face 238, e.g., along the axial direction A. The distance between the first face 236 and the second face 238 defines a thickness of the retainer 230. The retainer 230 further extends between a first end 240 and a second end 242, e.g., along the radial direction R. The centerline axis CA extends through the firewall seal 220 along the axial direction A for reference. Further, the retainer 230 defines a retainer pass-through aperture 244. When the firewall seal 220 is mounted to the firewall 200, the retainer pass-through aperture 244 is in communication with the pass-through aperture 202 of the firewall 200 (FIG. 2). In some embodiments, the retainer pass-through aperture 244 is concentrically aligned with the pass-through aperture 202 of the firewall 200. Moreover, the retainer 230 defines a first aperture 246 and a second aperture 248 spaced from the first aperture 246. More particularly, the first aperture 246 is defined by the retainer 230 at or adjacent the first side 232 and the second aperture 248 is defined at or adjacent the second side 234 of the retainer 230. The first aperture 246 and the second aperture 248 are defined on opposite sides of the retainer pass-through aperture 244.

In addition, as shown best in FIG. 5, the retainer 230 defines an interior slot 249. The interior slot 249 is defined between the first face 236 and the second face 238, e.g., along the axial direction A, and is coplanar with at least one of the first face 236 and the second face 238. For this embodiment, the interior slot 249 is coplanar with both the first and second faces 236, 238. Moreover, for this embodiment, the interior slot 249 is defined midway between the first and second faces 236, 238 along the axial direction A. The spring plate 250 is disposed within the interior slot 249 for structurally reinforcing the retainer 230, among other advantages.

Figure 7:
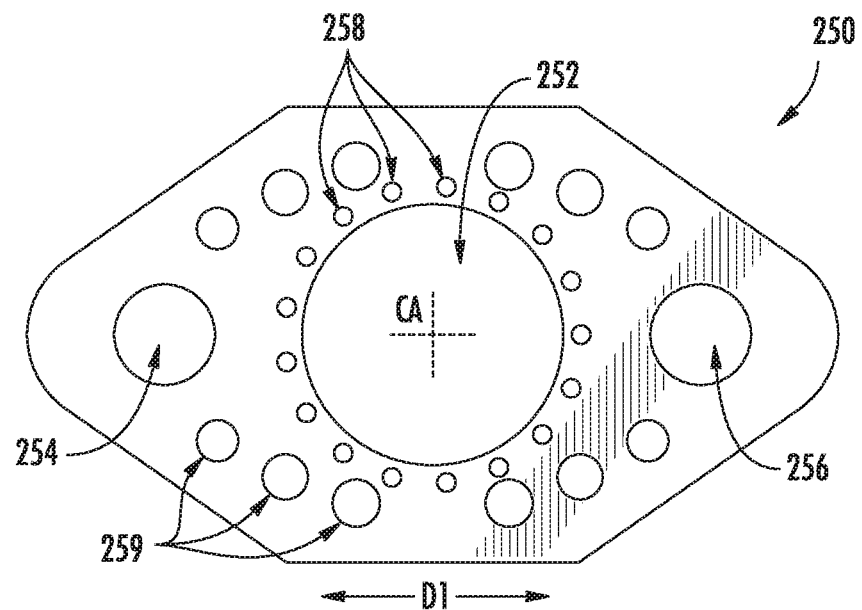
FIG. 7 provides a perspective view of a spring plate 250 of the firewall seal of FIG. 3.

FIG. 7 provides a perspective view of the spring plate 250 of FIG. 3. As noted above, the spring plate 250 is disposed with the interior slot 249 and is generally coplanar with the first and second faces 236, 238 of the retainer 230 (FIG. 5). For this embodiment, the spring plate 250 is formed of a metal material. Similar to the retainer 230, the spring plate 250 defines a plate pass-through aperture 252. When the firewall seal 220 is mounted to the firewall 200 (FIG. 2), the plate pass-through aperture 252 is in communication with the pass-through aperture 202 of the firewall 200 as well as the retainer pass-through aperture 244 (FIG. 6). Accordingly, a pass-through member 210 may extend through the aperture 202 of the firewall 200 and through the firewall seal 220. In some embodiments, the plate pass-through aperture 252 is concentrically aligned with the pass-through aperture 202 of the firewall 200 as well as the retainer pass-through aperture 244.

Furthermore, the spring plate 250 defines a first aperture 254 and a second aperture 256 spaced from the first aperture 254, e.g., along the first direction D1. More particularly, the first aperture 254 and the second aperture 256 are defined on opposite sides of the plate pass-through aperture 252. A plurality of intermediate apertures 258 are defined by the spring plate 250 circumferentially about the plate pass-through aperture 252. For this embodiment, the intermediate apertures 258 are evenly spaced from one another along the circumferential direction C and are each spaced the same radial distance from the centerline axis CA. In addition, a plurality of outer apertures 259 are defined by the spring plate 250 radially outward of the intermediate apertures 258 with respect to the centerline axis CA. The outer apertures 259 may be circular as shown in FIG. 7 or may have an elongated slot shape. The arrangement of the intermediate apertures 258 and outer apertures 259 reduces the weight of the plate and provides flexibility to the spring plate 250 such that it may "spring back" the retainer 230 into position after the firewall seal 220 is mounted on the pass-through member 210 (FIG. 3) as described more fully below.

As shown best in FIG. 5, the firewall seal 220 includes a spherical bearing 260 or uniball. The spherical bearing 260 includes an outer race or outer retaining member 262 and an inner race or inner retaining member 264. For this embodiment, the outer and inner retaining members 262, 264 of the spherical bearing 260 are formed of a metal material. However, in some alternative embodiments, the outer and inner retaining members 262, 264 are formed of a silicone material. Generally, the spherical bearing 260 is retained by the retainer 230 at the retainer pass-through aperture 244. More specifically, an outer surface of the outer retaining member 262 is seated annularly along a rim 245 of the retainer 230 (FIGS. 5 and 6). The outer retaining member 262 extends annularly about the inner retaining member 264. The inner surface of the outer retaining member 262 is shaped complementary to the outer surface of the inner retaining member 264.

As shown particularly in FIG. 5, the inner surface of the outer retaining member 262 has a truncated spherical shape, and consequently, the complementary outer surface of the inner retaining member 264 likewise has a truncated spherical shape. The inner surface 266 of the inner retaining member 264 defines a bearing pass-through aperture 268. For this embodiment, the bearing pass-through aperture 268 is generally circular as viewed along the axial direction A and is sized to receive the pass-through member 210 therethrough. Accordingly, the inner retaining member 264 is configured to receive the pass-through member 210 extending through the aperture 202 of the firewall 200 (FIG. 2).

In some embodiments, the inner retaining member 264 is movable relative to the outer retaining member 262, e.g., to accommodate movement of a dynamic pass-through member 210. For instance, the inner retaining member 264 may be movable between a first position and a second position. For instance, as shown in FIG. 5, the inner retaining member 264 is movable between a first position (shown in solid lines) and a second position (shown in phantom lines). Accordingly, the spherical bearing 260 allows the pass-through member 210 to translate along the axial direction A and rotate about the centerline axis CA. In addition, for this embodiment, a liner 269 is disposed between the outer retaining member 262 and the inner retaining member 264, e.g., for facilitating movement of the inner retaining member 264 relative to the outer retaining member 262. As one example, the liner 269 may be formed of a polytetrafluoroethylene (PTFE) material, bearing metal, or any fire-resistant metal. In some embodiments, however, the spherical bearing 260 does not include a liner.

As noted above, the spherical bearing 260 is retained by the rim 245 of the retainer 230 defining the retainer pass-through aperture 244 (FIG. 6). As shown best in FIGS. 4 and 5, the firewall seal 220 includes a first grommet 270 seated against the first face 236 and a second grommet 272 seated against the second face 238 of the retainer 230. The first grommet 270 is annular or ring-shaped and extends circumferentially about the centerline axis CA. Likewise, the second grommet 272 is annular or ring-shaped and extends circumferentially about the centerline axis CA. Notably, the first and second grommets 270, 272 each include retention portions 274, 276, respectively. The retention portion 274 of the first grommet 270 extends radially inward of the rim 245 and engages the outer retaining member 262 of the spherical bearing 260. Similarly, the retention portion 276 of the second grommet 272 extends radially inward of the rim 245 and engages the outer retaining member 262 of the spherical bearing 260. Accordingly, the first grommet 270 and the second grommet 272 retain the outer retaining member 262 of the spherical bearing 260 along the axial direction A. In some embodiments, when the outer retaining member 262 of the spherical bearing 260 is formed of a metal material, a gap is defined between the outer retaining member 262 and the rim 245 of the retainer 230 that defines the retainer pass-through aperture 244.

For this embodiment, the first and second grommets 270, 272 are formed of a metal material. However, in some alternative embodiments, the first and second grommet 270, 272 are formed of a silicone material. In addition, in some embodiments, the first and second grommets 270, 272 are formed with the retainer 230 as a single, unitary monolithic piece. For instance, the first and second grommets 270, 272 may be molded or additively printed along with the retainer 230 such that the retainer 230 defines the first and second grommets 270, 272. In some embodiments, one or both grommets 270, 272 may include one or more wiper blades as attachments to the grommets 270, 272 as shown in FIG. 8, especially when operating in environments that include finer dust and dirt particles.

As shown best in FIGS. 3 and 4, for mounting of the firewall seal 220 to the firewall 200, the firewall seal 220 includes a first bushing 275 and a second bushing 278. The first bushing 275 is annular and extends through the first aperture 246 defined by the retainer 230 and the first aperture 254 defined by the spring plate 250 (FIGS. 6 and 7). The first bushing 275 defines a first aperture 277 through which one or more mechanical fasteners (not shown) may be inserted to mount the firewall seal 220 to the firewall 200 (FIG. 2). In a similar fashion, the second bushing 278 is annular and extends through the second aperture 248 defined by the retainer 230 and the second aperture 256 defined by the spring plate 250 (FIGS. 6 and 7). The second bushing 278 defines a second aperture 279 through which one or more mechanical fasteners (not shown) may be inserted to mount the firewall seal 220 to the firewall 200 (FIG. 2). For this embodiment, the first and second bushings 275, 278 are both formed of a metal material. As such, metal fasteners may be utilized to mount firewall seal 220 to the firewall 200 without damaging the silicone-based material of the retainer 230.

Figure 8:
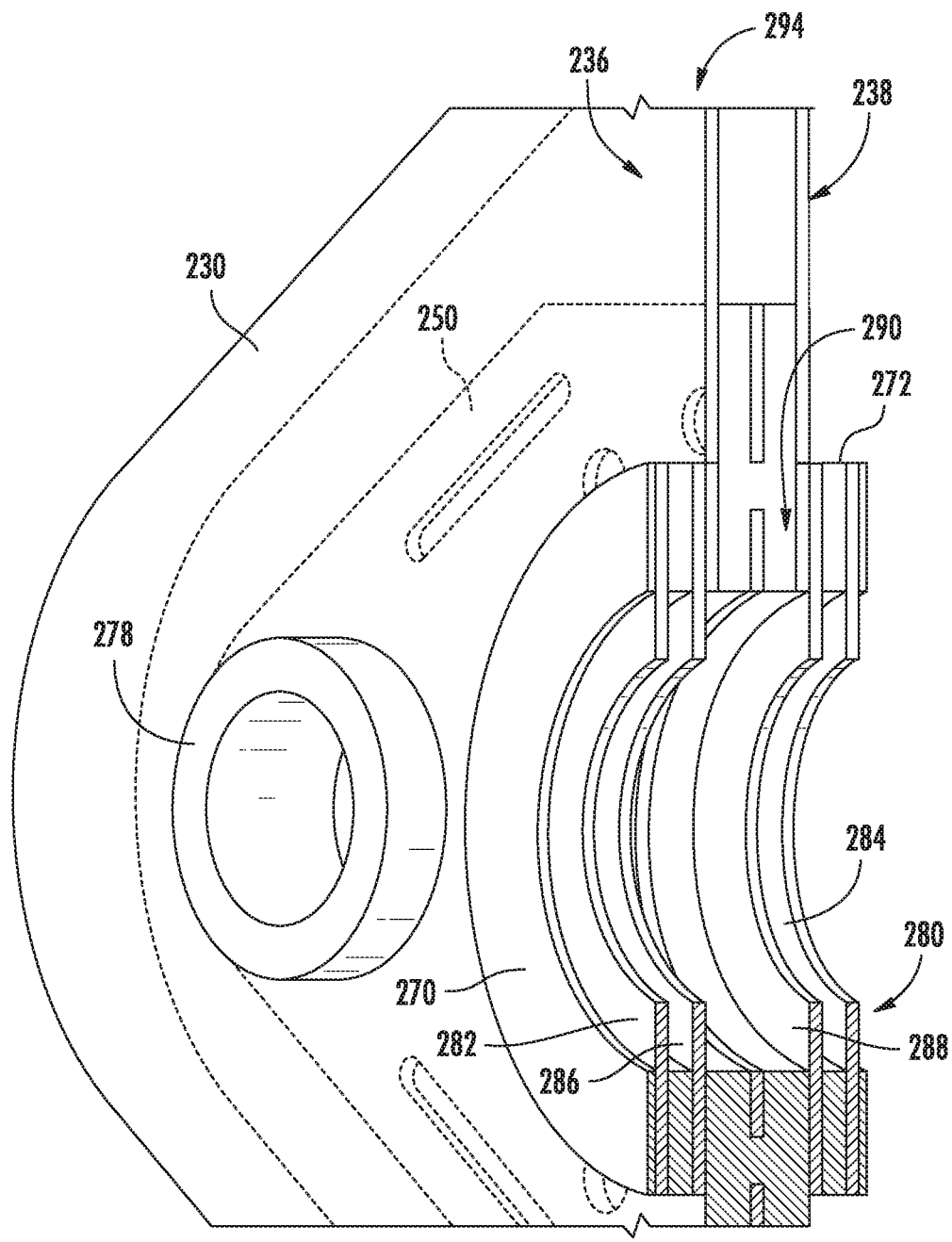
FIG. 8 provides a cross sectional view of another exemplary firewall seal in accordance with exemplary embodiments of the present disclosure.

FIG. 8 provides a cross sectional view of another exemplary firewall seal 220 in accordance with exemplary embodiments of the present disclosure. As shown, for this embodiment, the firewall seal 220 includes one or more wiper blades 280 embedded within at least one of the first grommet 270 and the second grommet 272 and configured to engage the pass-through member 210. More particularly, for this embodiment, the one or more wiper blades 280 include a first end wiper blade 282 embedded within the first grommet 270, a second end wiper blade 284 embedded within the second grommet 272, and at least one interior wiper blade embedded within at least one of the first grommet 270 and the second grommet 272 and positioned between the first end wiper blade 282 and the second end wiper blade 284, e.g., along the axial direction A. The firewall seal 220 of the depicted embodiment of FIG. 8 includes a first interior wiper blade 286 embedded within the first grommet 270 and a second interior wiper blade 288 embedded within the second grommet 272. The first interior wiper blade 286 is spaced from the second interior wiper blade 288, e.g., along the axial direction A.

Moreover, for this embodiment, the first end wiper blade 282 and the second end wiper blade 284 are formed of a silicone rubber material and at least one of the interior wiper blades 286, 288 are formed of a fiber cloth material. The wiper blades 280 are formed of a flexible material to allow for movement of the pass-through member 210 to rotate as needed. The silicone rubber material first end and second end wiper blades 282, 284 prevent foreign objects, such as e.g., dust and dirt, from coming into contact with the spherical bearing 260. Moreover, as the pass-through member 210 is translated or rotated, the fiber cloth first end and second interior wiper blades 286, 288 engage the outer surface of the pass-through member 210 to prevent finer dust and dirt particles from contacting the various elements of the spherical bearing 260. Such wiper blades 280 may be particularly applicable to firewall seals 220 that are directly in or adjacent the flow path of airflow or gasses flowing into or from a turbine engine. For instance, the firewall seal 220 for sealing the pass-through member 210 extending through the firewall 200 of FIG. 2 is positioned adjacent to the inlet 104 of the gas turbine engine 100, and accordingly, wiper blades incorporated into the firewall seal would serve to prevent various particles from contacting and potentially damaging the components of the spherical bearing 260.

In accordance with exemplary aspects of the present disclosure, the firewall seal 220 may include various quick connect features that facilitate ease of assembly and disassembly of the firewall seal 220 to and from the pass-through member 210.

Figure 9:
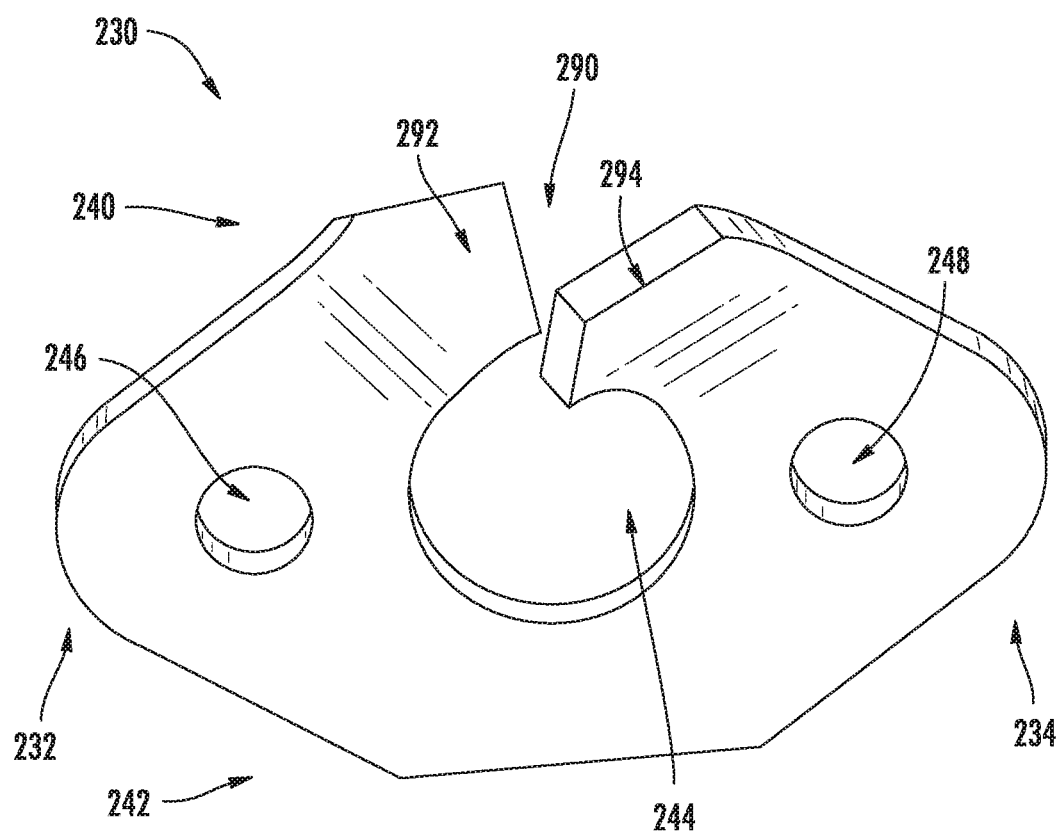
FIG. 9 provides a perspective view of an exemplary retainer in accordance with exemplary aspects of the present disclosure.

FIG. 9 provides a perspective view of an exemplary retainer 230 in accordance with exemplary aspects of the present disclosure. As shown, the retainer 230 at least partially defines a slit 290 extending from one of the first end 240 and the second end 242 to the retainer pass-through aperture 244. Particularly, for this embodiment, the retainer 230 at least partially defines a slit 290 extending from the first end 240 to the retainer pass-through aperture 244. The slit 290 allows a first portion 292 of the retainer 230 to be separated from a second portion 294 of the retainer 230 such that a pass-through member may be passed between the first portion 292 and the second portion 294 and moved into positioned within the retainer pass-through aperture 244. In such embodiments, the retainer 230 may be formed of an elastomeric material, such as e.g., silicone or a silicone rubber material. If other components (e.g., the spherical bearing 260 of FIG. 5) of the firewall seal 220 are formed of metal or other rigid materials, they can first be slid onto the pass-through member and then the retainer 230 may be mounted thereon to retain such components. The quick connect features of the retainer 230 may provide for more efficient assembly and disassembly of the firewall seal 220 to and from the pass-through member.

Figure 10:
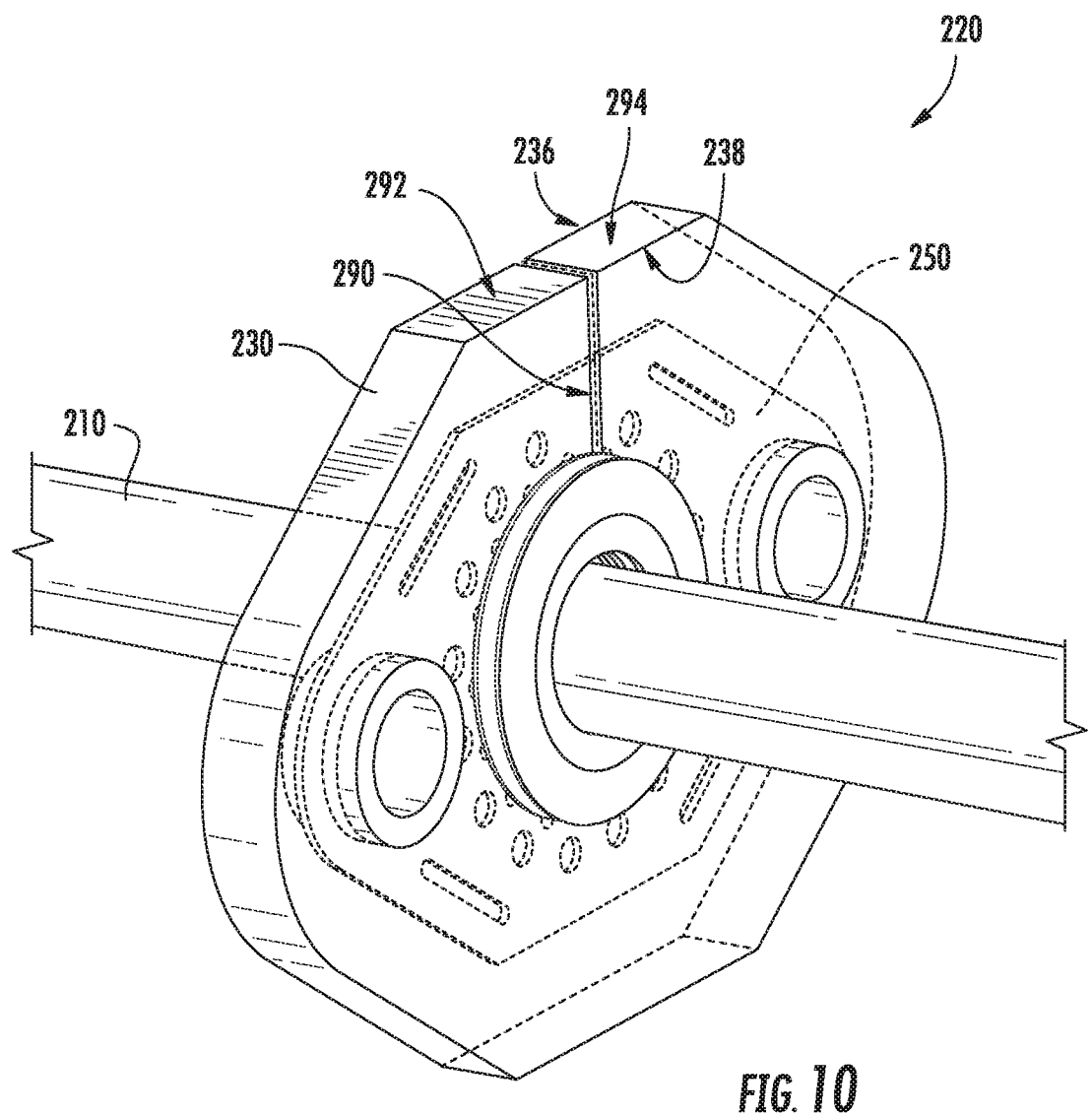
FIG. 10 provides a close up, perspective view of another exemplary firewall seal depicting a pass-through member extending therethrough in accordance with exemplary aspects of the present disclosure.

FIG. 10 provides a close up, perspective view of an exemplary firewall seal 220 depicting a pass-through member 210 extending therethrough. As shown in FIG. 10, the firewall seal 220 includes spring plate 250 embedded within the retainer 230 between the first face 236 and the second face 238. For this embodiment, the spring plate 250 is formed of a silicone metal material. Moreover, as shown, the spring plate 250 also at least partially defines the slit 290. In this way, when the first portion 292 and the second portion 294 of the retainer 230 are separated from one another so that the pass-through member 210 may be slid between and positioned within the retainer pass-through aperture 244 (FIG. 6), the spring plate 250 facilitates the "spring back" action of the first and second portions 292, 294 to their respective resting state (e.g., as shown in FIG. 10). Particularly, the spring plate 250 has a stiffness such that when the firewall seal 220 is mounted onto the pass-through member 210, the spring plate 250 allows for the first and second portions 292, 294 to be parted from one another yet returns or "springs back" the first and second portions 292, 294 to their respective resting states when the force or forces separating the first and second portions 292, 294 are removed.

Figure 11:
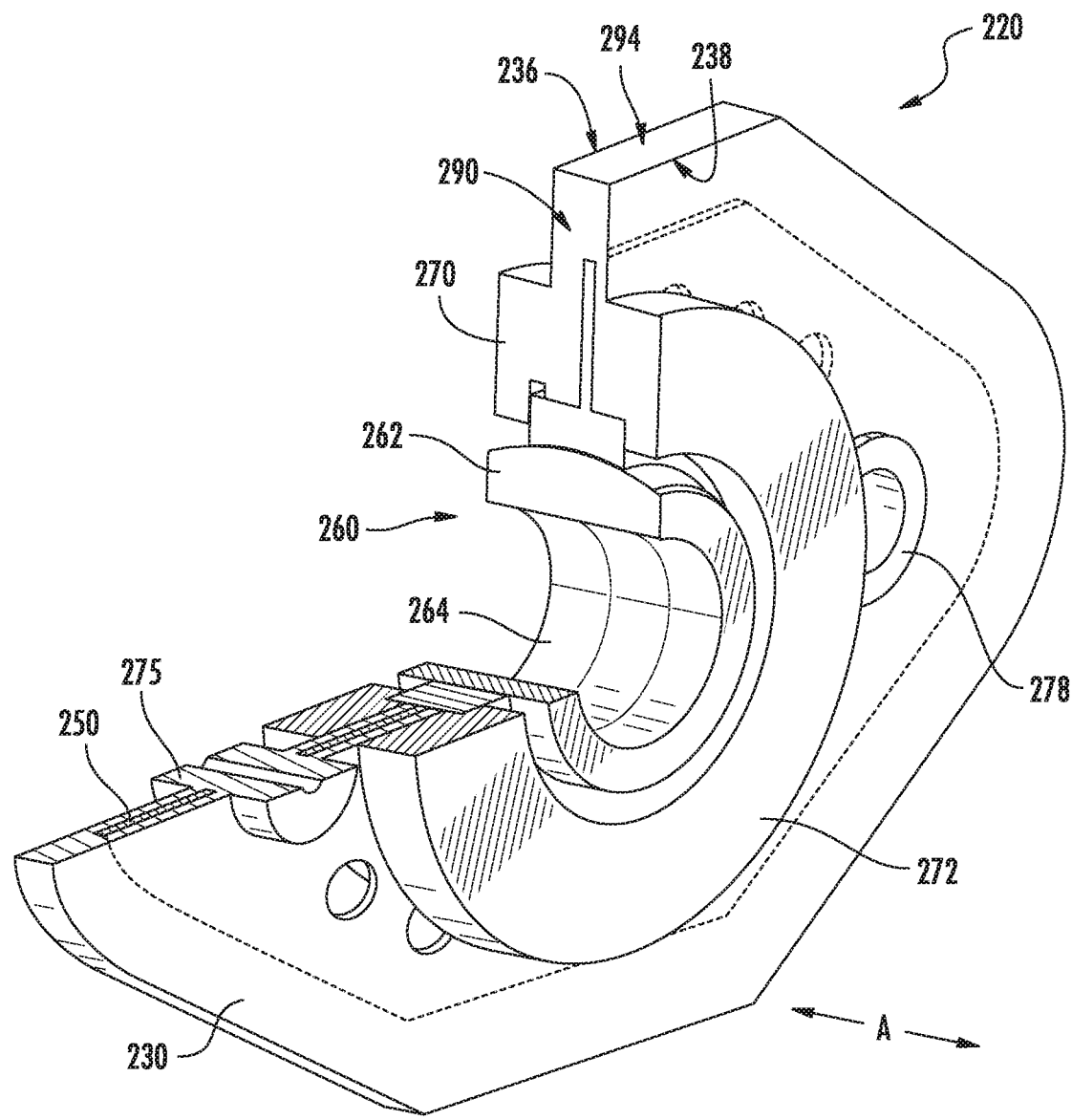
FIG. 11 provides a close up, perspective view of the firewall seal of FIG. 10 depicting a portion of the firewall seal in cross section.

FIG. 11 provides a close up, perspective view of the firewall seal 220 of FIG. 10 depicting a portion of the firewall seal 220 in cross section. As shown in FIG. 11, in some embodiments, the outer retaining member 262 and the inner retaining member 264 of the spherical bearing 260 is formed of a silicone metal material. Moreover, in such embodiments, the outer retaining member 262 and the inner retaining member 264 of the spherical bearing 260 both at least partially define the slit 290. Accordingly, in such embodiments, the spherical bearing 260 need not be slid onto the pass-through member 210 (FIG. 10) (as is the case when the spherical bearing 260 is formed of a metal material); rather, the retainer 230 and spherical bearing 260 may be mounted together and mounted onto the pass-through member 210 as one assembly. Such features may provide for more efficient assembly and disassembly of the firewall seal 220 to and from the pass-through member 210.

In addition, in some embodiments, the firewall seal 220 includes first grommet 270 positioned adjacent the first face 236 of the retainer 230 and second grommet 272 positioned adjacent the second face 238 of the retainer 230. The first grommet 270 is configured to retain the spherical bearing 260, e.g., along the axial direction A, and likewise, the second grommet 272 is configured for retaining the spherical bearing 260, e.g., along the axial direction A in a direction opposite the manner in which the first grommet 270 retains the spherical bearing 260. In such embodiments, the first grommet 270 and the second grommet 272 are each formed of a silicone material and both at least partially define the slit 290. Consequently, in such embodiments, the first and second grommets 270, 272 need not be slid onto the pass-through member 210 (as is the case when the first and second grommets 270, 272 are formed of a metal material); rather, the retainer 230 and the first and second grommets 270, 272 may be mounted onto the pass-through member 210 as one assembly via the slit 290. Such features may provide for more efficient assembly and disassembly of the firewall seal 220 to and from the pass-through member 210.

In some exemplary embodiments, with reference again to FIG. 8, one or more wiper blades 280 are embedded with at least one of the first grommet 270 and the second grommet 272 and are configured to engage the pass-through member 210. In some embodiments, at least one of the one or more wiper blades 280 is formed of a fiber cloth material, such as e.g., either the first interior wiper blade 286 or the second interior wiper blade 288 (or both). In some embodiments, at least one of the one or more wiper blades 280 is formed of a silicone rubber material, such as e.g., either the first end wiper blade 282 or the second end wiper blade 284 (or both). In such embodiments, at least one of the one or more wiper blades 280 at least partially defines the slit 290. That is, the slit 290 may extend through the retainer 230, potentially other components, and at least one of the wiper blades 280. Such features may provide for more efficient assembly and disassembly of the firewall seal 220 to and from the pass-through member 210.

Various embodiments of a firewall seal for a pass-through member extending through an aperture defined by a firewall of a turbine engine are described above. Notably, the firewall seal may include certain quick connect features that facilitate more efficient assembly and disassembly of the firewall seal to and from the pass-through member. Particularly, various components of the firewall seal may define a slit extending therethrough and the firewall seal may include a spring plate that reinforces the retainer and provides for a "spring back" action of the retainer when the retainer is mounted onto a pass-through member. Moreover, the arrangement and type of materials used in the firewall seal may eliminate complicated stack-up of parts, reduce the weight and cost of the firewall seal, and reduce the space envelope required for mounting the firewall seal to the pass-through member and firewall. Moreover, a spherical bearing of the firewall seal may include features for receiving a static or dynamic pass-through member therethrough and for allowing the pass-through member to translate and rotate. In addition, the materials and arrangement of the components of the firewall seal isolate vibration of the pass-through member. Particularly, the materials and arrangement of the components of the firewall seal isolate vibration and prevent such vibrations from propagating to the firewall in which the firewall seal is mounted. Furthermore, the firewall seal described herein may transfer loads/torque and absorb radial deflection of the pass-through member.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A firewall seal for a pass-through member extending through an aperture defined by a firewall, the firewall seal comprising:
    a retainer removably coupled with the firewall and extending between a first face and a second face opposing the first face, the retainer defining a retainer pass-through aperture in communication with the aperture of the firewall;
    a spring plate embedded within the retainer; and
    a spherical bearing retained by the retainer at the retainer pass-through aperture, the spherical bearing comprising an outer retaining member and an inner retaining member movable relative to the outer retaining member, the inner retaining member configured to receive the pass-through member extending through the aperture of the firewall.

2. The firewall seal of claim 1, wherein the retainer is formed of an elastomeric material and the spring plate is formed of a metal material.

3. The firewall seal of claim 1, wherein the retainer defines an interior slot between the first face and the second face and coplanar with at least one of the first face and the second face, and wherein the spring plate is disposed within the interior slot.

4. The firewall seal of claim 1, wherein the firewall seal defines an axial direction and a centerline axis extending along the axial direction, and wherein the firewall seal further comprises:
    a first grommet seated against the first face and extending circumferentially about the centerline axis; and
    a second grommet seated against the second face and extending circumferentially about the centerline axis;
    wherein the first grommet and the second grommet retain the outer retaining member of the spherical bearing along the axial direction.

5. The firewall seal of claim 4, further comprising:
    one or more wiper blades embedded within at least one of the first grommet and the second grommet and configured to engage the pass-through member.

6. The firewall seal of claim 5, wherein the one or more wiper blades comprise a first end wiper blade embedded within the first grommet, a second end wiper blade embedded within the second grommet, and at least one interior wiper blade embedded within at least one of the first grommet and the second grommet and positioned between the first end wiper blade and the second end wiper blade.

7. The firewall seal of claim 6, wherein the first end wiper blade and the second end wiper blade are formed of a silicone rubber material and the at least one interior wiper blade is formed of a fiber cloth material.

8. The firewall seal of claim 1, wherein the outer retaining member extends annularly about the inner retaining member and the inner retaining member has an outer surface having a truncated spherical shape and an inner surface shaped complementary to an outer surface of the pass-through member.

9. The firewall seal of claim 1, wherein the outer retaining member of the spherical bearing is formed of a metal material, and wherein a gap is defined between the outer retaining member and a rim of the retainer.

10. The firewall seal of claim 1, wherein the firewall extends from a casing of an engine.

11. A firewall seal for a pass-through member extending through an aperture defined by a firewall, the firewall seal defining an axial direction, the firewall seal comprising:
    a retainer removably coupled with the firewall and extending between a first end and a second end along a direction orthogonal to the axial direction, wherein the retainer defines a retainer pass-through aperture and is formed of an elastomeric material; and
    a spherical bearing retained by the retainer at the retainer pass-through aperture, the spherical bearing comprising an outer retaining member and an inner retaining member movable relative to the outer retaining member, the inner retaining member configured to receive the pass-through member extending through the aperture of the firewall;
    wherein the retainer at least partially defines a slit extending from one of the first end and the second end to the retainer pass-through aperture,
    wherein the retainer extends between a first face and a second face along the axial direction, and wherein the firewall seal further comprises: a spring plate embedded within the retainer between the first face and the second face, and wherein the spring plate is formed of a silicone metal material, and wherein the spring plate also at least partially defines the slit.

12. The firewall seal of claim 11, wherein the spring plate has a stiffness such that when the firewall seal is mounted onto the pass-through member, the spring plate allows for the slit to be parted for mounting of the firewall seal.

13. The firewall seal of claim 11, further comprising:
    a first grommet positioned adjacent the first face of the retainer and configured for retaining the spherical bearing along the axial direction;
    a second grommet positioned adjacent the second face of the retainer and configured for retaining the spherical bearing along the axial direction;

wherein the first grommet and the second grommet are each formed of a silicone material, and wherein the first grommet and the second grommet both at least partially define the slit.

14. The firewall seal of claim 13, wherein one or more wiper blades are embedded with at least one of the first grommet and the second grommet and are configured to engage the pass-through member.

15. The firewall seal of claim 14, wherein at least one of the one or more wiper blades at least partially defines the slit.

16. The firewall seal of claim 14, wherein at least one of the one or more wiper blades is formed of a fiber cloth material and at least one of the one or more wiper blades is formed of a silicone rubber material.

17. The firewall seal of claim 11, wherein the outer retaining member and the inner retaining member of the spherical bearing are formed of a silicone metal material, and wherein the outer retaining member and the inner retaining member of the spherical bearing both at least partially define the slit.

18. A turbine engine, comprising:
   a casing;
   a firewall extending from the casing and defining an aperture;
   a pass-through member extending through the aperture; and
   a firewall seal removably mounted to the firewall, the firewall seal comprising:
      a retainer formed of an elastomeric material and extending between a first face and a second face opposing the first face, the retainer defining a retainer pass-through aperture in communication with the aperture of the firewall;
      a spring plate formed of a metal material and embedded within the retainer between the first face and the second face; and
      a spherical bearing retained by the retainer at the retainer pass-through aperture, the spherical bearing comprising an outer retaining member comprising an inner surface having a truncated spherical shape and an inner retaining member movable relative to the outer retaining member and comprising an outer surface shaped complementary to the inner surface of the outer retaining member, the inner retaining member configured to receive the pass-through member extending through the aperture of the firewall and through the retainer pass-through aperture.

19. The turbine engine of claim 18, wherein the turbine engine defines an inlet and the firewall seal is positioned proximate the inlet, and wherein the firewall seal comprises one or more wiper blades configured to engage the pass-through member.

* * * * *